(12) United States Patent
Vanni et al.

(10) Patent No.: US 8,763,775 B2
(45) Date of Patent: Jul. 1, 2014

(54) TORQUE CONVERTER WITH TURBINE INERTIA IN A DAMPER ASSEMBLY

(75) Inventors: Jeremy Vanni, Sterling, OH (US); Brian C. Zaugg, Millersburg, OH (US)

(73) Assignee: Schaeffler Technologies GmbH & Co. KG, Herzogenaurach (DE)

( * ) Notice: Subject to any disclaimer, the term of this patent is extended or adjusted under 35 U.S.C. 154(b) by 264 days.

(21) Appl. No.: 13/314,481

(22) Filed: Dec. 8, 2011

(65) Prior Publication Data
US 2012/0160628 A1 Jun. 28, 2012

Related U.S. Application Data

(60) Provisional application No. 61/426,099, filed on Dec. 22, 2010.

(51) Int. Cl.
*F16H 45/02* (2006.01)

(52) U.S. Cl.
USPC ........................ 192/3.29; 192/213.1

(58) Field of Classification Search
USPC ........................................ 464/68.7
See application file for complete search history.

(56) References Cited

U.S. PATENT DOCUMENTS

| 8,403,762 B2* | 3/2013 | Steinberger | 192/3.29 |
| 2009/0125202 A1 | 5/2009 | Swank et al. | |
| 2010/0096788 A1* | 4/2010 | Farahati et al. | 267/140.13 |
| 2012/0073925 A1* | 3/2012 | Kneidel | 192/3.28 |

* cited by examiner

*Primary Examiner* — Rodney Bonck
(74) *Attorney, Agent, or Firm* — Simpson & Simpson, PLLC

(57) ABSTRACT

A torque converter, including: a turbine; a cover; a lock-up clutch engageable with the cover; and a first damper assembly including: a first flange connected to the lock-up clutch so as to rotate in unison with the clutch; at least one side plate; a second flange for connection to an input shaft for a transmission; a first plurality of springs engaged with the first flange and with the at least one side plate; and a second plurality of springs, at least partially circumferentially aligned with the first plurality of springs, and engaged with the at least one side plate and the second flange. The torque converter includes a second damper assembly connected to the first damper assembly and including: a third side plate fixed to the turbine; and a third plurality of springs, radially outside of the first and second pluralities of springs, and engaged with the third side plate.

12 Claims, 3 Drawing Sheets

TORQUE CONVERTER WITH TURBINE INERTIA IN A DAMPER ASSEMBLY

CROSS-REFERENCE TO RELATED APPLICATIONS

This application claims the benefit under 35 U.S.C. §119 (e) of U.S. Provisional Application No. 61/426,099 filed Dec. 22, 2010, which application is incorporated herein by reference.

TECHNICAL FIELD

The present disclosure relates to a torque converter with increased turbine inertia in a damper assembly. In particular, the present disclosure relates to torque converter with a series damper assembly into which additional turbine inertia is introduced via a Tilger damper.

BACKGROUND

Vibration from an engine can be transmitted to a transmission via a torque converter connected to the engine and the transmission. It is known to use a Tilger damper in a torque converter to attenuate vibration transmitted from an engine to a transmission.

SUMMARY

According to aspects illustrated herein, there is provided a torque converter, including: a turbine; a cover arranged to receive torque from an engine; a lock-up clutch engageable with the cover; and a first damper assembly including: a first flange connected to the lock-up clutch so as to rotate in unison with the lock-up clutch; at least one side plate; a second flange for connection to an input shaft for a transmission; a first plurality of springs engaged with the first flange and with the at least one side plate; and a second plurality of springs, at least partially circumferentially aligned with the first plurality of springs, and engaged with the at least one side plate and with the second flange. The torque converter includes a second damper assembly connected to the first damper assembly and including: a third side plate fixed to the turbine; and a third plurality of springs, radially outside of the first and second pluralities of springs, and engaged with the at least one side plate and the third side plate.

According to aspects illustrated herein, there is provided a torque converter, including: a turbine; a cover arranged to receive torque from an engine; a lock-up clutch engageable with the cover plate; a first damper assembly connected to the lock-up clutch, arranged to connect to an input shaft for a transmission, and including at least one side plate and first and second circumferentially aligned pluralities of springs, the first plurality of springs in contact with a component of the first damper assembly with which the second plurality of springs is not in contact; a second damper assembly fixed to the turbine, connected to the first damper assembly, and including a third plurality of springs radially outside of the first and second pluralities of springs. When the lock-up clutch is engaged with the cover the torque converter includes: a drive torque transmission path from the cover through the lock-up clutch to the at least one side plate; and an absorption torque path, separate from the first torque transmission path, from the turbine to the at least one side plate via the second damper assembly. Torque due to inertia of the turbine is transmitted to the at least one side plate via the absorption torque path.

According to aspects illustrated herein, there is provided a torque converter, including: a turbine; a cover arranged to receive torque from an engine; a lock-up clutch engageable with the cover plate; a first damper assembly connected to the lock-up clutch, arranged to connect to an input shaft for a transmission, and including at least one side plate and first and second circumferentially aligned pluralities of springs, the first plurality of springs in contact with a component of the first damper assembly with which the second plurality of springs is not in contact; and a second damper assembly fixed to the turbine, connected to the first damper assembly, and including a third plurality of springs radially outside of the first and second pluralities of springs. When the lock-up clutch is engaged with the cover, the torque converter includes: a drive torque transmission path from the cover through the lock-up clutch to the at least one side plate; and an absorption torque path, separate from the drive torque transmission path, from the turbine to the at least one side plate via the second damper assembly. Torque due to inertia from the cover is transmittable, along the drive torque transmission path, to the at least one side plate via the lock-up clutch. Torque due to inertia of the turbine, is transmittable via the absorption torque path. A spring constant for springs in the third plurality of springs is selected so that, at a first frequency, the respective torques from the drive torque transmission path and the absorption torque path urge the at least one side plate in respective opposite rotational directions.

These and other objects and advantages of the present disclosure will be readily appreciable from the following description of the invention and from the accompanying drawings and claims.

BRIEF DESCRIPTION OF THE DRAWINGS

Various embodiments are disclosed, by way of example only, with reference to the accompanying schematic drawings in which corresponding reference symbols indicate corresponding parts, in which.

DETAILED DESCRIPTION

At the outset, it should be appreciated that like drawing numbers on different drawing views identify identical, or functionally similar, structural elements of the disclosure. It is to be understood that the disclosure as claimed is not limited to the disclosed aspects.

Furthermore, it is understood that this disclosure is not limited to the particular methodology, materials and modifications described and as such may, of course, vary. It is also understood that the terminology used herein is for the purpose of describing particular aspects only, and is not intended to limit the scope of the present disclosure.

Unless defined otherwise, all technical and scientific terms used herein have the same meaning as commonly understood to one of ordinary skill in the art to which this disclosure belongs. It should be understood that any methods, devices or materials similar or equivalent to those described herein can be used in the practice or testing of the disclosure.

Figure 1A:
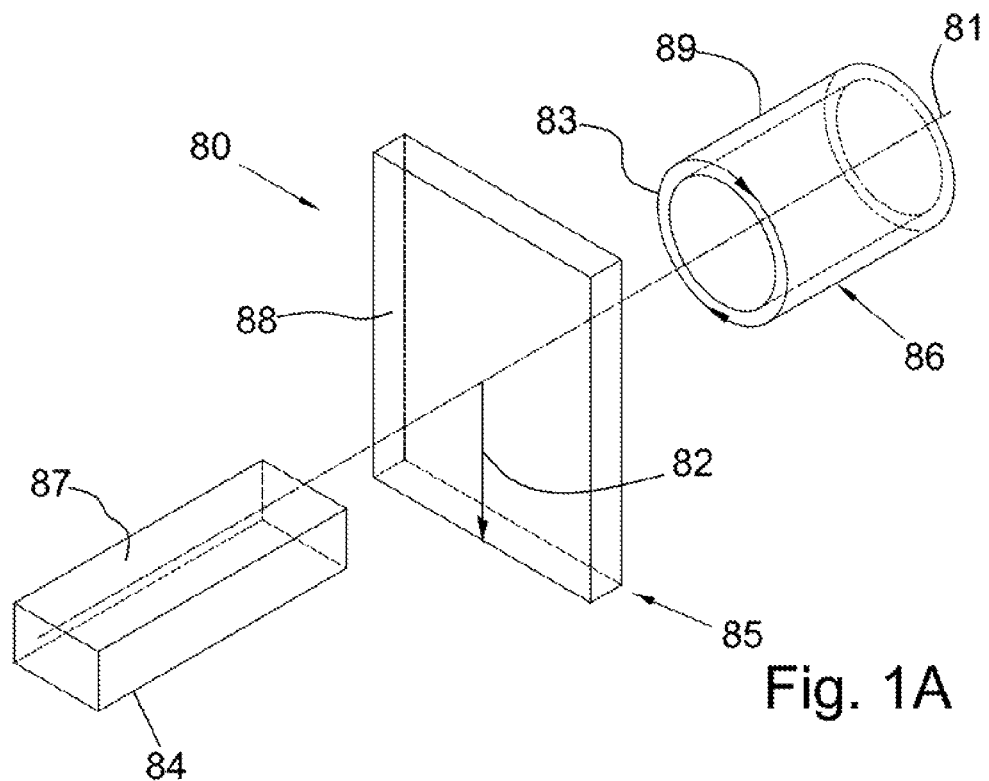
FIG. 1A is a perspective view of a cylindrical coordinate system demonstrating spatial terminology used in the present application.

FIG. 1A is a perspective view of cylindrical coordinate system 80 demonstrating spatial terminology used in the present application. The present invention is at least partially described within the context of a cylindrical coordinate system. System 80 has a longitudinal axis 81, used as the reference for the directional and spatial terms that follow. The adjectives "axial," "radial," and "circumferential" are with respect to an orientation parallel to axis 81, radius 82 (which is orthogonal to axis 81), and circumference 83, respectively. The adjectives "axial," "radial" and "circumferential" also are regarding orientation parallel to respective planes. To clarify the disposition of the various planes, objects 84, 85, and 86 are used. Surface 87 of object 84 forms an axial plane. That is, axis 81 forms a line along the surface. Surface 88 of object 85 forms a radial plane. That is, radius 82 forms a line along the surface. Surface 89 of object 86 forms a circumferential plane. That is, circumference 83 forms a line along the surface. As a further example, axial movement or disposition is parallel to axis 81, radial movement or disposition is parallel to radius 82, and circumferential movement or disposition is parallel to circumference 83. Rotation is with respect to axis 81.

The adverbs "axially," "radially," and "circumferentially" are with respect to an orientation parallel to axis 81, radius 82, or circumference 83, respectively. The adverbs "axially," "radially," and "circumferentially" also are regarding orientation parallel to respective planes.

Figure 1B:
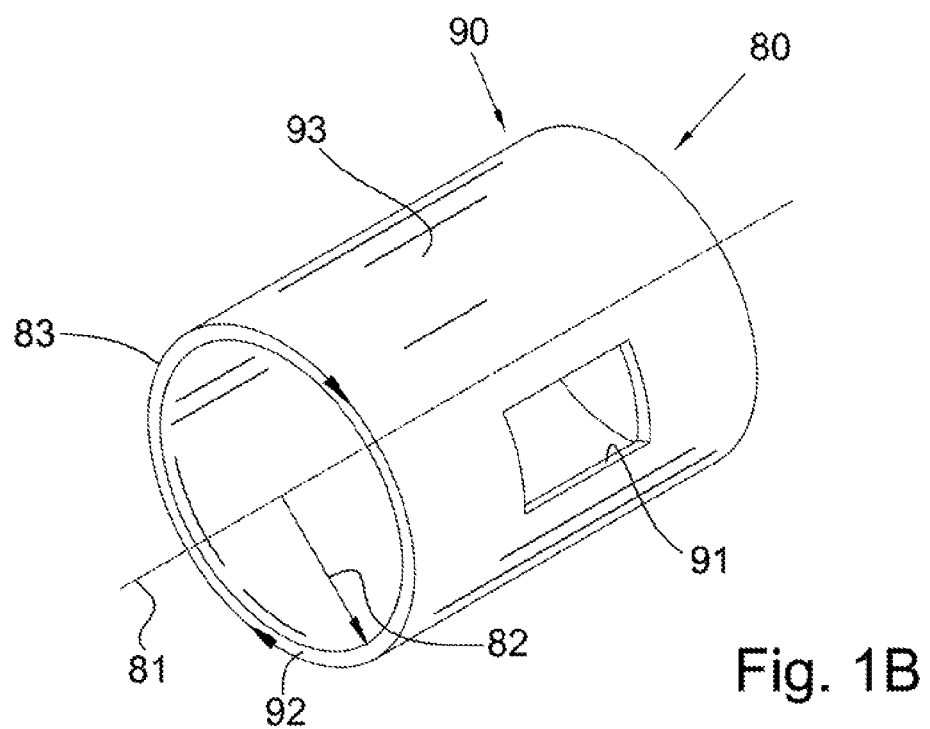
FIG. 1B is a perspective view of an object in the cylindrical coordinate system of FIG. 1A demonstrating spatial terminology used in the present application.

FIG. 1B is a perspective view of object 90 in cylindrical coordinate system 80 of FIG. 1A demonstrating spatial terminology used in the present application. Cylindrical object 90 is representative of a cylindrical object in a cylindrical coordinate system and is not intended to limit the present invention in any manner. Object 90 includes axial surface 91, radial surface 92, and circumferential surface 93. Surface 91 is part of an axial plane, surface 92 is part of a radial plane, and surface 93 is a circumferential surface.

Figure 2:
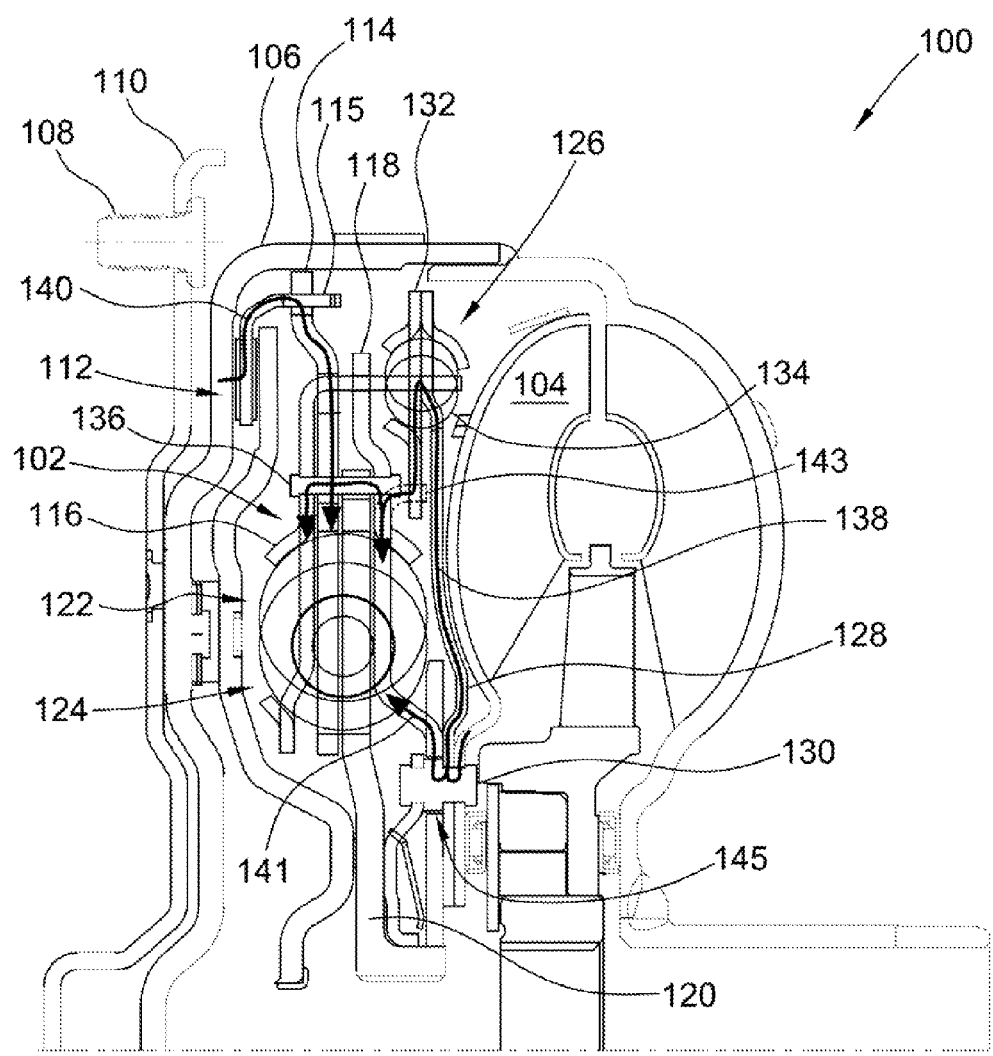
FIG. 2 is a partial cross-sectional view of a torque converter with increased turbine inertia in a damper assembly; and, FIG. 3 is a front unstacked view of the flanges, side plates, and springs shown for the series damper shown in FIG. 2.

FIG. 2 is a partial cross-sectional view of torque converter 100 with turbine inertia introduced into damper assembly 102. Torque converter 100 includes turbine 104, cover 106 arranged to receive torque from an engine (not shown), for example, via studs 108 and drive plate 110, and lock-up clutch 112 engageable with the cover. Damper assembly 102 includes flange 114 connected to the lock-up clutch via plate 115 of the lock-up clutch so as to rotate in unison with the lock-up clutch, at least one side plate, and flange 120 for connection to an input shaft (not shown) for a transmission (not shown). In an example embodiment, the at least one side plate is side plates 116 and 118. Damper assembly 102 includes plurality of springs 122 engaged with flange 114 and with the side plates, and plurality of springs 124, at least partially circumferentially aligned with plurality of springs 122, and engaged with the side plates and with the flange 120.

Figure 3:
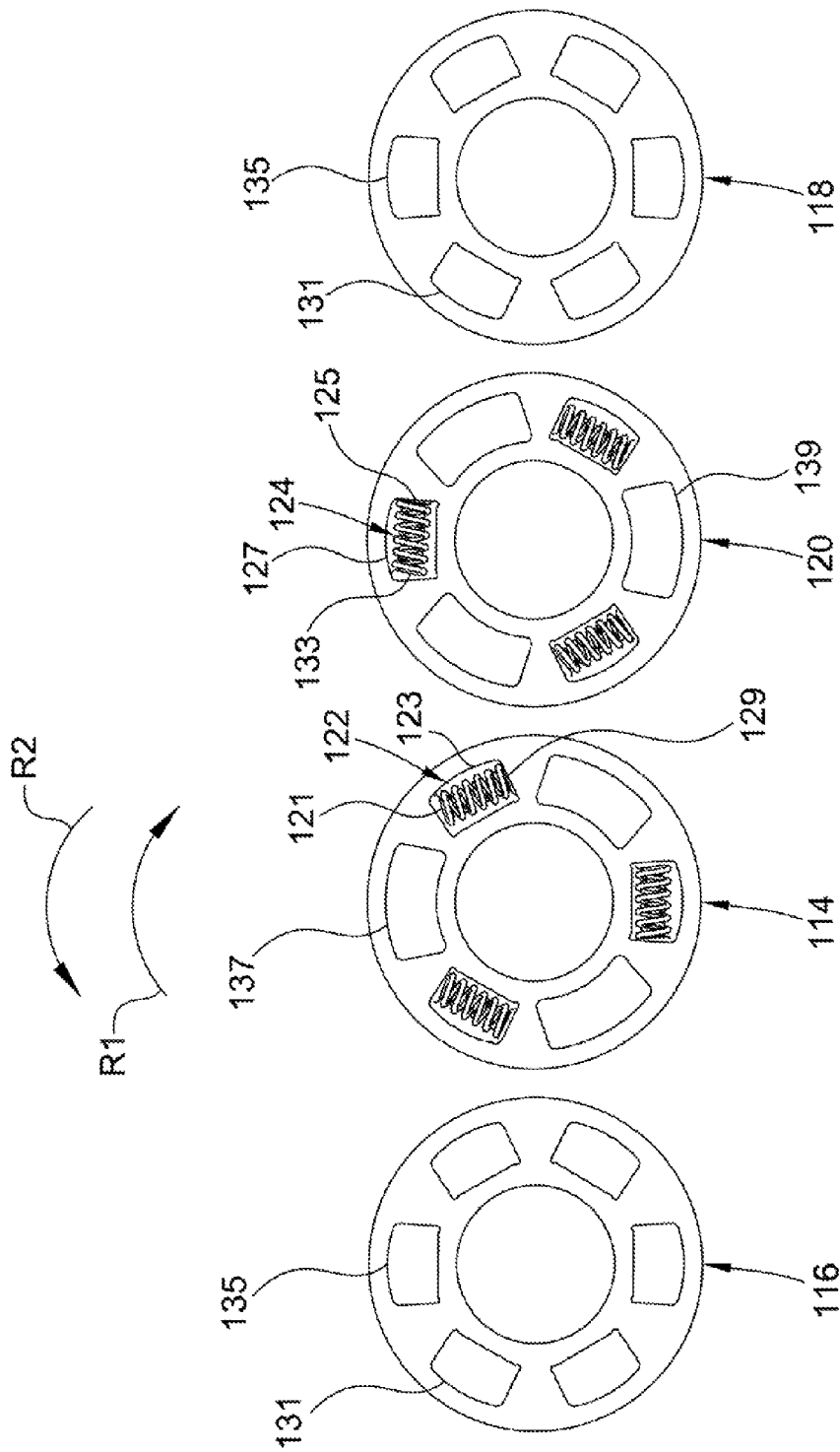

FIG. 3 is a front unstacked view of the flanges, side plates, and springs shown for the series damper shown in FIG. 2. The following should be viewed in light of FIGS. 2 and 3. For purposes of illustration, we assume that torque is delivered to plate 114 from clutch 112 in clockwise direction R1. In FIG. 3, springs 122 are shown only engaged with side plate 114 and springs 124 are shown only engaged with flange 120, for example, ends 121 of springs 122 are engaged with openings 123 in plate 114 and ends 125 of springs 124 are engaged with openings 127 in flange 120. It should be understood that ends 129 of springs 122 are engaged with side plates 116 and 118 in openings 131 and that ends 133 of springs 124 are engaged with openings 135 in side plates 116 and 118. Springs 124 are partially disposed in openings 137 of plate 114, but do not contact the edges of the openings. Springs 122 are partially disposed in openings 139 of flange 120, but do contact the edges of the openings. That is, openings 137 and 139 supply clearance for the axial stacking of plates 114, 116, and 118, and flange 120.

The torque converter also includes damper assembly 126, otherwise known as a Tilger damper, connected to damper assembly 102 and including side plate 128 fixed to the turbine, for example, by rivet 130, side plate 132 fixed to side plate 128 and plurality of springs 134. Plurality of springs 134 is radially outside of pluralities of springs 122 and 124 and is engaged with plates 128 and 132. In an example embodiment, side plates 116 and 118 are fixed to each other, for example, by rivet 136, and side plate 116 is engaged with plurality of springs 134. Rivet 130 also connects plate 118 to the turbine. Rivet 130 passes through slot 145 in plate 118 so that relative rotation between the rivet and plate 118 is possible. In general, the slot has a relatively small circumferential extent. That is, rivet 130 has a circumferential clearance to side plate 118 allowing proper operation of damper 126 in lockup mode.

In lock-up mode, that is, when the lock-up clutch is engaged, the torque converter includes absorption torque path 138 from the turbine to plates 116 and 118 via rivet 130, plates 128 and 132, and springs 134. The torque converter also includes drive torque converter path 140 from cover 104 to plates 116 and 118 via plates 115 and 114 and springs 122. During torque converter mode (lock-up clutch unengaged, or open), torque path 141 from the turbine to flange 120 is formed via rivet 130, plates 116 and 118, and springs 124. In an example embodiment, torque is transmitted from the turbine via rivet 130, plates 128 and 132, and tab 143 to plates 116 and 118. Tab 143 has a circumferential clearance to plate 132, that is a nominal amount of relative rotation of the tab and plate 132 is possible. If torque from turbine 104 exceeds the torque capacity of damper 126 (i.e., maximum torque before springs are damaged), torque from plates 128 and 132 may be transmitted directly to plate 118 through tab 143. Similarly, when turbine torque exceeds the torque capacity of damper 102, torque from plates 116 and 118 may be transmitted directly to flange 120 through rivets 136.

As noted supra, undesirable vibrations can be transmitted from an engine to a transmission via a torque converter connected to the engine and the transmission. For example, engine vibration can be transmitted along path 140 to the transmission. Damper assembly 126 can be used to introduce beneficial torque due to inertia, or mass, from a turbine in the torque converter to a damper assembly, for example, series damper 102, to counteract undesirable vibration.

Torque along torque transmission path 140, for example, due to the cover and the engine when the cover is connected to an engine, urges plates 116 and 118 in one rotational direction, for example, R1. Torque along the torque transmission path 138, for example, due to the turbine and plates 128 and 132, urges plates 116 and 118 in an opposite rotational direction, for example, R2. Thus, the vibration associated with the inertia of the engine and the cover along path 140 is counteracted by torque due to the inertia of the turbine and plates 128 and 132 via a force applied by springs 134 to plate 116. Thus, via a path outside of drive torque transmission path 140, torque due to the inertia of the turbine and damper assembly 126 is introduced to damper assembly 102 advantageously dampening undesirable vibration associated with operation of the engine.

It should be understood that torque along path 140 can shift directions according to the acceleration and deceleration of the cover and engine. For example, as the engine fires, the cover accelerates in one direction and after firing, the cover decelerates in an opposite direction. Torque transmitted along path 138 oscillates accordingly to oppose the torque from path 140. In an example embodiment, a spring constant for springs 134 is selected so that, for a natural frequency for damper assembly 102, the cover and the turbine oscillate 180 degrees out of phase. That is, respective torques along paths 140 and 138 are in opposition at plates 116 and 118, optimizing dampening of undesirable engine vibration.

The location of assembly 126 radially outside of damper 102, or at least radially outside of springs 122 and 124, increases the radial extent and desirable inertia of plates 128 and 132. In addition, the extension of plate 128 to rivet 130 increases the inertia of plate 128.

It will be appreciated that various of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

What we claim is:

1. A torque converter, comprising:
   a turbine;
   a cover arranged to receive torque from an engine;
   a lock-up clutch engageable with the cover;
   a first damper assembly including:
      a first flange connected to the lock-up clutch so as to rotate in unison with the lock-up clutch;
      a first side plate;
      a second flange for connection to an input shaft for a transmission;
      a second side plate non-rotatable connected to the first side plate and located between the first and second flanges and the cover in an axial direction;
      a first plurality of springs engaged with the first flange, the first side plate, and the second side plate; and,
      a second plurality of springs, at least partially circumferentially aligned with the first plurality of springs, and engaged with the first side plate, the second side plate and, the second flange;
   a second damper assembly connected to the first damper assembly and including:
      a third side plate fixed to the turbine;
      a fourth side plate; and,
      a third plurality of springs:
         radially outside of the first and second pluralities of springs; and,
         engaged with the second, third, and fourth side plates.

2. The torque converter of claim 1 wherein:
   the first and second side plates are fixed to rotate in unison.

3. The torque converter of claim 1 further comprising, when the lock-up clutch is closed:
   a drive torque transmission path from the cover to the first and second side plates via the first flange and the first plurality of springs; and,
   an absorption torque path from the turbine to the first and second side plates via the second damper assembly, wherein:
   torque from inertia of the cover is transmitted to the first and second side plates via the drive torque transmission path; and,
   torque from inertia of the turbine and the third plate is transmitted to the first and second side plates via the absorption torque path.

4. The torque converter of claim 3 wherein a spring constant for springs in the third plurality of springs is selected so that, for a first frequency, for movement of the first and second side plates in a first rotational direction due to torque along the drive torque transmission path, torque along the absorption torque path urges the first and second side plates in a second rotational direction, opposite the first rotational direction.

5. The torque converter of claim 4 wherein:
   the torque transmitted along the absorption torque path is due to the inertia of the turbine and the third side plate and the inertia of the fourth side plate.

6. A torque converter, comprising:
   a turbine;
   a cover arranged to receive torque from an engine;
   a lock-up clutch engageable with the cover;
   a first damper assembly connected to the lock-up clutch, arranged to connect to an input shaft for a transmission, and including at least one side plate and first and second circumferentially aligned pluralities of springs, the first plurality of springs in contact with a component of the first damper assembly with which the second plurality of springs is not in contact; and
   a second damper assembly, connected to the first damper assembly, and including:
      a first side plate fixed to the turbine and non-rotatably connected to the at least one side plate; and,
      a third plurality of springs radially outside of the first and second pluralities of springs and engaged with the first side plate, wherein:
   when the lock-up clutch is engaged with the cover:
      a drive torque transmission path is formed from the cover through the lock-up clutch to the at least one side plate;
      an absorption torque path, separate from the first torque transmission path, is formed from the turbine to the at least one side plate via the first side plate and the second damper assembly;
      torque due to inertia of the turbine is transmitted to the at least one side plate via the absorption torque path; and,
      the absorption torque path bypasses the third plurality of springs for sufficient relative rotation between the at least one side plate and the first side plate.

7. The torque converter of claim 6 wherein:
   torque along the drive torque transmission path urges the at least one side plate in a first rotational direction; and,
   inertia along the absorption torque path urges the at least one side plate in a second rotational direction, opposite the first rotational direction.

8. The torque converter of claim 6 wherein:
   the second damper assembly includes a second side plate engaged with the third plurality of springs; and,
   the torque transmitted along the absorption torque path is from the inertia of the turbine and inertia of the first and second side plates.

9. The torque converter of claim 6 wherein a spring constant for springs in the third plurality of springs is selected so that, for a first frequency, the cover and the turbine oscillate 180 degrees out of phase.

10. The torque converter of claim 6 wherein:
    the at least one side plate includes second and third side plates;
    the first damper assembly includes:
       a first flange connected to the lock-up clutch so as to rotate in unison with the lock-up clutch; and,
       a second flange for connection to the input shaft for a transmission;

the first plurality of springs is engaged with the first flange and with the second and third side plates;
the second plurality of springs is engaged with the second and third side plates and with the second flange; and,
the second and third plates are engaged with the third plurality of springs.

11. The torque converter of claim 10 wherein:
the second damper assembly includes a fourth side plate engaged with the third plurality of springs; and,
the fourth plate is engagable with the first damper assembly.

12. A torque converter, comprising:
a turbine;
a cover arranged to receive torque from an engine;
a lock-up clutch engageable with the cover;
a first damper assembly including:
   a first flange connected to the lock-up clutch so as to rotate in unison with the lock-up clutch;
   a first side plate;
   a second side plate;
   a second flange for connection to an input shaft for a transmission;
   a first plurality of springs engaged with the first flange, the first side plate, and the second side plate; and,
   a second plurality of springs, at least partially circumferentially aligned with the first plurality of springs, and engaged with the first side plate, the second side plate and, the second flange; and,
a second damper assembly connected to the first damper assembly and including:
   a third side plate fixed to the turbine;
   a fourth side plate rotatable for a limited degree with respect to the second side plate; and,
   a third plurality of springs:
     radially outside of the first and second pluralities of springs; and,
     engaged with the first, third and fourth side plates, wherein:
when the lock-up clutch is engaged with the cover:
   a first drive torque transmission path is formed from the cover through the lock-up clutch to the first and second side plates; and,
   an absorption torque path, separate from the first drive torque transmission path, is formed from the turbine to the first and second side plates via the second damper assembly:
torque due to inertia from the cover is transmittable, along the first drive torque transmission path, to the first and second side plates via the lock-up clutch;
torque due to inertia of the turbine is transmittable via the absorption torque path; and
when the lock-up clutch is unengaged with the cover and the fourth side plate has rotated, with respect to the second side plate, beyond the limited degree, the absorption torque path by-passes the third plurality of springs.

* * * * *